Patented Mar. 5, 1929.

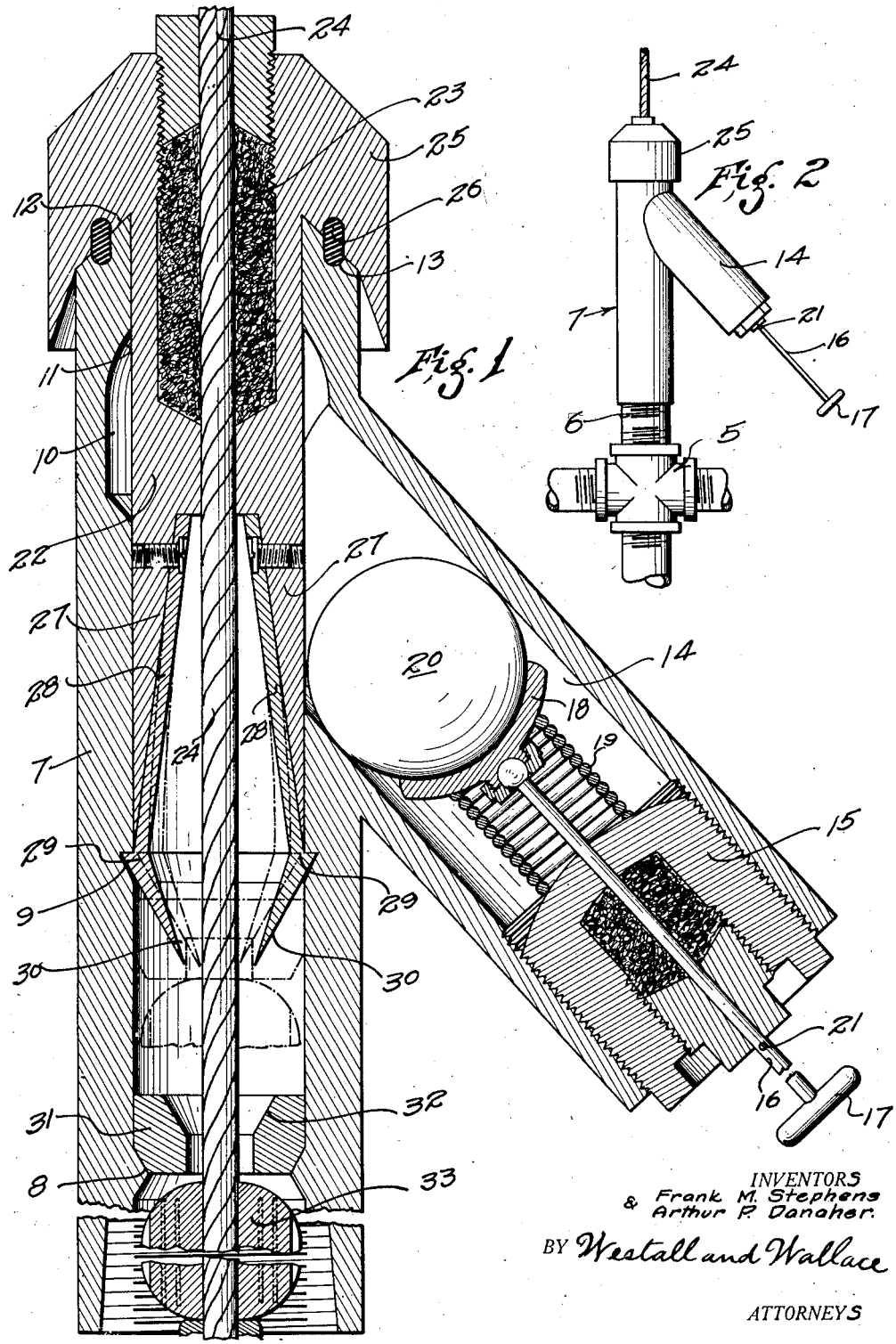

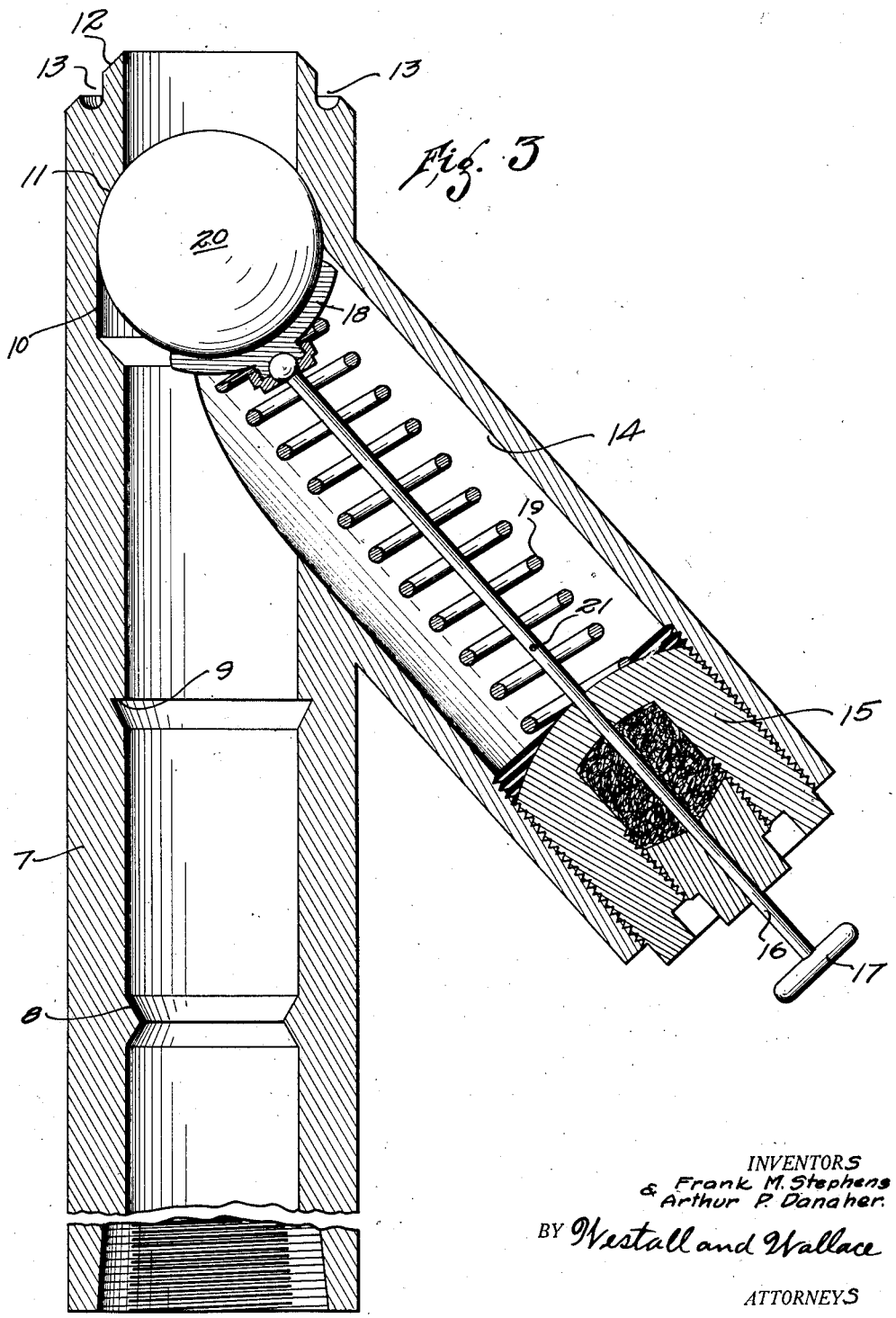

1,704,152

UNITED STATES PATENT OFFICE.

FRANK M. STEPHENS AND ARTHUR P. DANAHER, OF LONG BEACH, CALIFORNIA.

OIL SAVER.

Application filed October 18, 1927. Serial No. 226,865.

This invention relates to oil savers adapted for use with swabs or the like. The objects of this invention are first, to provide a head having an opening for insertion and withdrawal of a swab; second, to provide an automatic closure member for said opening actuated upon withdrawal of the swab; third, to provide means to main said closure member in inoperative position; fourth, to provide a stripper for insertion in the opening in the head and means to lock the same in place; fifth, to provide an automatic release for said stripper; and sixth to provide details of structure whereby a simple, compact, device economical to manufacture, positive in operation and subject to rough usage without injury may be obtained.

Other objects and advantages will be made fully apparent from the following specification considered in connection with the accompanying drawing, in which:

Fig. 1 is an axial section through on oil saver embodying the invention with the stripper in position, parts being broken out to make the view more compact; Fig. 2 is an elevation of the stripper mounted upon a Christmas tree; and Fig. 3 is an axial section showing the stripper removed and the ball check closing the opening.

Referring more particularly to the drawing especially Fig. 2, a fragment of a Christmas tree such as is mounted at the top of a well is indicated generally by 5. A nipple 6 extends from one arm of the cross and mounted thereon is the body of the oil saver. This body is indicated by 7 and is of slightly larger diameter than the bore of the tubing to permit passage of a swab beyond a ledge 8 adjacent the bottom of the body. Disposed above the ledge is an annular notch 9. The bore is enlarged adjacent the upper end of the body to provide a ball cage 10 and a seat 11 therefor. The upper edge of the body is bevelled as indicated by 12, and a recess is formed therein for a packing insert. Branching downwardly and outwardly is a tubular pocket member 14 providing a chamber or a pocket for a ball valve. The bore of member 14 communicates with the bore of the body. At the end of the pocket 14 is a stuffing box indicated generally by 15 arranged for the passage therethrough of a stem 16. Handle 17 for manipulating the stem is secured to the end thereof. The stem 16 has a saddle 18 secured thereto by means of a ball and socket joint. A compression spring 19 engages the saddle and the stuffing box tending to push the saddle outwardly. Resting in the saddle is a ball check 20 of such diameter that it may engage the seat 11 and close the bore of the body. Spring 19 tends to force the ball toward its seat, and, if there is no obstruction in the bore, this operation will be effected as shown in Fig. 3. However, it is desirable to retract the stem and maintain it in retracted position. To this end, an opening 21 extends through the stem in such position that when the saddle and ball are retracted, the opening is disposed outside of the stuffing box and a pin may be placed in the opening so as to hold the stem retracted.

Referring particularly to Figs. 1 and 2, the stripper comprises a cylindrical body 22 having a stuffing box 23 for the passage therethrough of a cable or line 24. The body is adapted to be inserted in the bore of the head and provides a snug fit. At the top of the body is a petticoat 25 having a bevelled under face adapted to seat on the bevelled face 12 of the body. A packing insert 26 will serve to provide a leak tight fit. Depending from the body are legs 27. Secured to the inner sides of the legs are spring leaves 28. These provide spring fingers having knuckles 29 adapted to engage the notch 9. The ends of the fingers are inclined inwardly as indicated by 30. A ring 31 is disposed within the bore of the head resting upon the ledge 8. This ring has an opening at the center through which passes the cable 24 and is provided with a bevelled inner edge 32 for receiving the ends 30 of the fingers. If the ring is pressed upwardly against the fingers, it will collapse the latter and withdraw the knuckles from the notch.

At the beginning of operations, the oil saver parts are in the position shown in Fig. 3, the ball closing the bore. To insert the stripper, the stem 16 is retracted, allowing the ball to enter the pocket. The stem is held in retracted position by inserting a pin in the opening 21. The oil stripper is then inserted, and as it slips into the body, the knuckles 29 engage the notch 9 and lock the stripper in place. The swab will first have been inserted, the cable passing through the stripper. Ring 31 rests upon ledge 8. Upon pulling the swab upwardly to withdraw the same, the ring is raised into the dotted line position shown in Fig. 1, collapsing the fingers and unlocking the stripper whereupon the latter may be withdrawn.

It is found advisable to provide sinker bars to maintain the ball check in position while the swab is being withdrawn. These sinker bars are of ovoid shape and of substantially the same diameter as the bore, being preferably corrugated to permit free passage up and down. One is marked 33 in Fig. 1. Several of these are placed upon the cable above the swab. When the swab is about to be withdrawn the stem is released, the ball tending to enter the bore. The sinker bars prevent this until the swab has reached the end of the pocket.

What we claim is:

1. An oil saver comprising a head having a bore for the passage of a swab and an internal seat, a divergent branch, a ball for engagement with said seat whereby to close said bore and for passage into said pocket, a slidable stem, a saddle loosely supporting said ball on the end of said stem, a compression spring embracing said stem and urging said saddle and ball into projected position so as to seat said ball.

2. An oil saver comprising a head having a bore for the passage of a swab and an internal seat, a divergent branch providing a pocket, a ball for engagement with said seat, to close said bore and for passage into said pocket, a slidable stem, a saddle loosely supporting said ball on the end of said stem, a compression spring embracing said stem and engaging said saddle so as to urge said ball against said seat, and means to lock said stem in retracted position with said ball within said pocket.

3. An oil saver comprising a head having a bore for the passage of a swab, said bore being enlarged adjacent the upper end to provide a ball cage, a divergent branch forming a pocket communicating with the enlarged portion of said bore, a ball check to close said bore at the upper end of said enlarged passage and for entrance into said pocket, a slidable stem disposed in said divergent branch, a saddle for said ball, on the end of said stem, a compression spring embracing said stem and abutting said saddle so as to urge said saddle and ball against said seat, and means to lock said stem in retracted position.

4. An oil saver comprising a head having a bore for the passage of a swab and an internal valve seat adjacent the upper end, a lateral pocket communicating with said bore, a check for engagement with said seat to close said bore and for entrance into said pocket, means operable at will to urge said check against said seat or to retract said check into said pocket, a stripper having a stuffing box for passage of a line detachably mounted on said head so as to be removable upon engagement of the swab therewith for withdrawal.

5. An oil saver comprising a head having a bore for the passage of a swab and an internal valve seat adjacent the upper end, a divergent branch providing a pocket communicating with said bore, a check for engagement with said seat to close said bore and for the passage into said pocket, a slidable stem in said pocket for engagement with said check, a spring urging said stem into projected position so as to seat said check, and a stripper having a stuffing box for passage of a line detachably mounted on said head so as to be removable by withdrawal of said swab.

6. An oil saver comprising a head having a bore for the passage of a swab and an internal valve seat adjacent the upper end, a lateral pocket communicating with said bore, a check for engagement with said seat to close said bore and for entrance into said pocket, means operable at will to urge said check against said seat or to retract said check into said pocket, a stripper having a body slidable into and out of said bore and a stuffing box for passage of a line, there being co-operating catch and notch on said body and in said bore to act on said stripper therein and means operable by said swab to actuate said catch and release said stripper.

7. An oil saver comprising a head having a bore for the passage of a swab, and an internal valve seat adjacent its upper end, a divergent branch providing a pocket communicating with said bore, a check for engagement with said seat to close said bore and for passage into said pocket, a slidable stem in said pocket having a saddle for engagement with said check, a spring urging said stem into projected position so as to seat said check, a stripper having a body slidable into and out of said bore and a stuffing box for passage of a line, there being a co-operating catch and notch on said body and in said bore to anchor said stripper therein, and means operable by said swab to actuate said catch and release said stripper.

8. An oil saver comprising a head having a bore for the passage of a swab and an internal valve seat adjacent the upper end, a lateral pocket communicating with said bore, a check for engagement with said seat to close said bore and for entrance into said pocket, means operable at will to urge said check against said seat or to detract said check into said pocket, a stripper having a body slidable into and out of said bore and a stuffing box for passage of a line, there being a notch in the wall of said bore, spring catch fingers depending from said body and having projections for entrance into said notch, and a ring having an opening for receiving the ends of said fingers to collapse the latter and withdraw the projection of said notches so as to release said stripper.

9. An oil saver comprising a head having a bore for the passage of a swab, a divergent branch providing a pocket communicating with said bore, a check for engagement with said seat to close said bore and for passage into said pocket, a slidable stem in said pocket having a saddle for engagement with said check, a spring urging said stem into projected position so as to seat said check, a stripper having a body slidable into and out of said bore and having a stuffing box for passage of a line, a notch in the wall of said bore, spring catch fingers depending from said body and having projections for entrance into said notch and a ring having an opening for receiving the ends of said fingers to collapse the latter and withdraw said projection from said notch so as to release said stripper.

10. An oil saver comprising a head having a bore for the passage therethrough of a swab, said bore being enlarged adjacent its upper end to provide a ball cage, a lateral pocket communicating with the enlarged portion of said bore, a ball for engagement with said seat to close said bore and for entrance into said pocket, means operable at will to urge said ball against said seat or to retract said ball into said pocket, a stripper having a body slidable into and out of said bore and a stuffing box for the passage of a line, there being a notch in the wall of said bore, spring fingers depending from said body and having projections for entering into said notch, a ring having an opening for receiving the ends of said fingers to collapse the latter and withdraw the projections from said notch, so as to release said stripper.

11. An oil saver comprising a head having a bore for the passage of a swab, there being an enlargement in said bore adjacent the upper end for a ball cage, a divergent branch, a ball for engagement with said seat to close said bore and for passage into said pocket, a slidable stem in said pocket having a saddle for engagement with said ball, a spring urging said stem into projected position so as to seat said ball, a stripper having a body slidable into and out of said bore and a stuffing box for passage of a line, a notch in the wall of said bore, spring catch fingers depending from said body and having projections for entrance into said notch, a ring having an opening for receiving the ends of said fingers to collapse the latter and withdraw the projections from said notch so as to release said stripper.

In witness that we claim the foregoing we have hereunto subscribed our names this 30th day of September, 1927.

FRANK M. STEPHENS.
ARTHUR P. DANAHER.